C. A. GRAVES.
MOVABLE AUTOMOBILE HEADLIGHT.
APPLICATION FILED MAY 2, 1916.
1,197,930.
Patented Sept. 12, 1916.
2 SHEETS—SHEET 1.
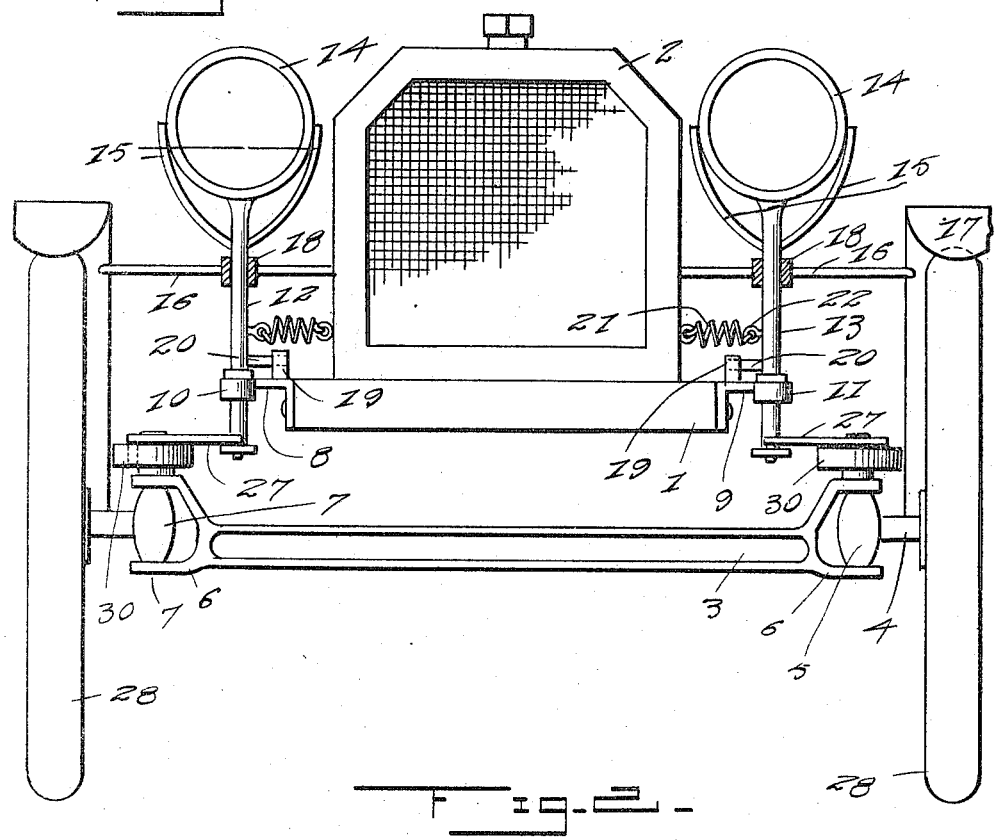
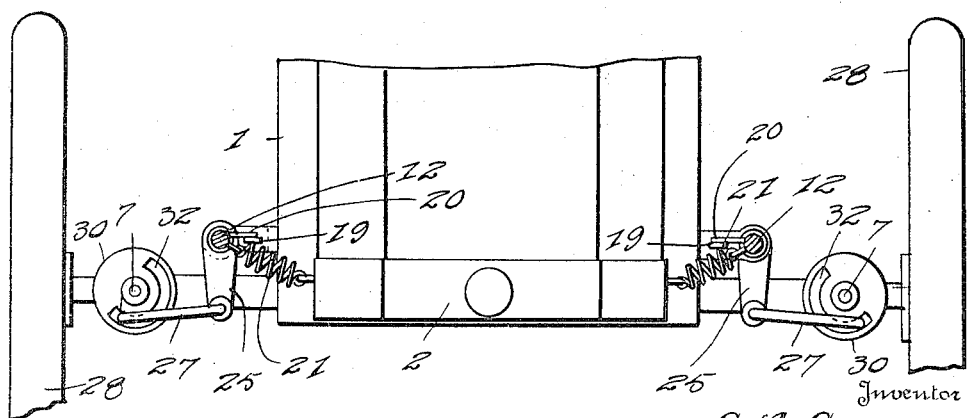

C. A. GRAVES.
MOVABLE AUTOMOBILE HEADLIGHT.
APPLICATION FILED MAY 2, 1916.
1,197,930.
Patented Sept. 12, 1916.
2 SHEETS—SHEET 2.
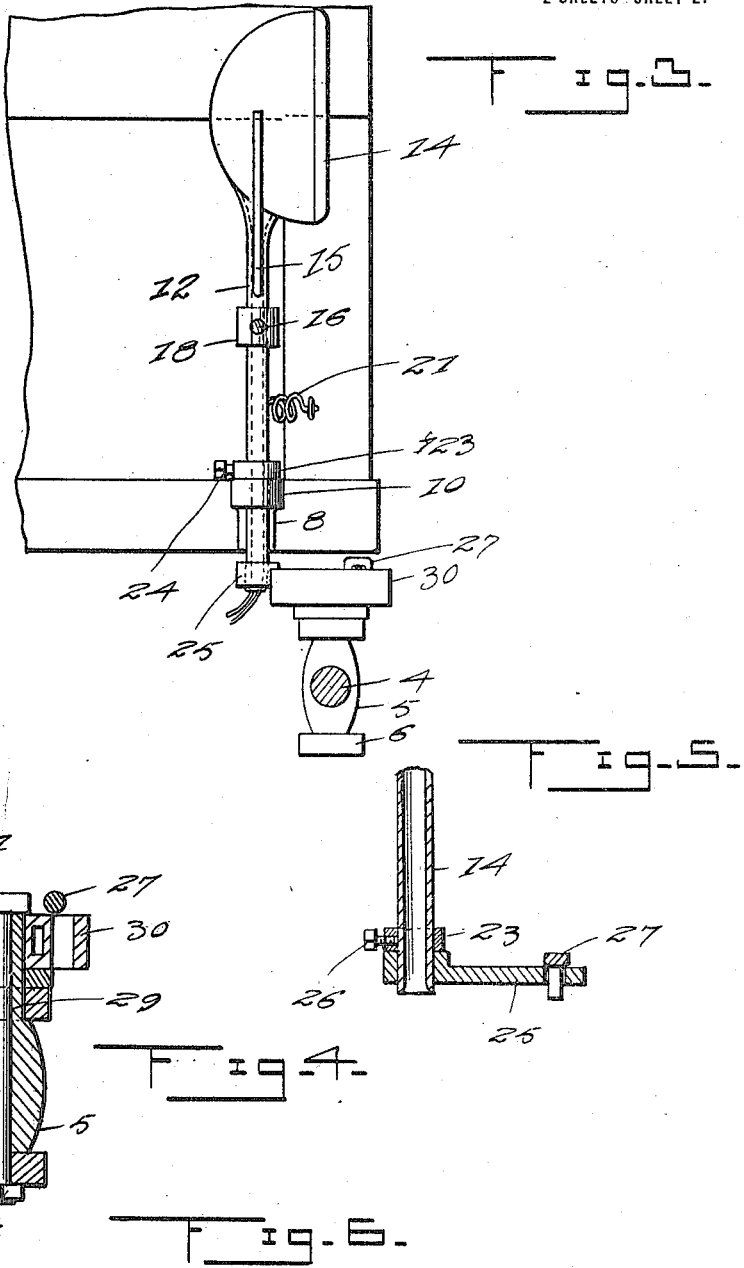
Witness
Inventor
C. A. Graves,
By
Attorney

UNITED STATES PATENT OFFICE.

CHESTER A. GRAVES, OF TOBIAS, NEBRASKA.

MOVABLE AUTOMOBILE-HEADLIGHT.

1,197,930.  Specification of Letters Patent.  Patented Sept. 12, 1916.

Application filed May 2, 1916. Serial No. 94,909.

*To all whom it may concern:*

Be it known that I, CHESTER A. GRAVES, a citizen of the United States, residing at Tobias, in the county of Saline and State of Nebraska, have invented certain new and useful Improvements in Movable Automobile-Headlights; and I do hereby declare the following to be a full, clear, and exact description of the invention, such as will enable others skilled in the art to which it appertains to make and use the same.

This invention relates to new and useful improvements in movable headlights for an automobile and one of its objects is the provision of a device of this character, which shall be simple, durable and efficient, and which may be manufactured and sold at a comparatively low cost.

Another object of this invention is to provide rotatably supported lamp standards having headlights secured thereto, each of which are adapted to be turned in opposite directions by the turning of the front wheels of the automobile to which they are adjacent to, whereby upon turning the front wheels in either direction, one of the lamp standards will be rotated in a corresponding direction to illuminate the turn in the roadway, while the other lamp standard maintains its normal position to illuminate or direct rays of light straight ahead of the automobile.

A further object of this invention is to provide means attached to the lamp standards and to the automobile for automatically returning the lamp standards to their normal position after they have been turned to illuminate the curve in the roadway.

A still further object of this invention is to provide a connection between the stub axles of the automobile upon which the front wheels are journaled and the lamp standards, whereby slight movement of the stub axles will not be imparted to the lamp standards and which will also allow for upward and downward movement of the stub axles with relation to the lamp standards when passing over uneven ground.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a front elevation of an automobile, illustrating the movable headlights attached thereto and constructed in accordance with my invention, Fig. 2 is a top plan view of the same, with the headlights removed, illustrating the means of connection between the stub axles and the lamp standards, Fig. 3 is a fragmentary side elevation illustrating the means of journaling the lamp standards to the automobile, Fig. 4 is a vertical sectional view illustrating the means of connecting an operating plate to the stub axles of the automobile, Fig. 5 is a detail sectional view of the lamp standards illustrating the means of securing an operating arm thereto, and Fig. 6 is a detail view partly in section illustrating the means of limiting the movement of the lamp standards.

Referring in detail to the drawings, the numeral 1 indicates a chassis of an automobile having a radiator 2 mounted on the forward end thereof and 3 the front axle which is of the stub axle type which consists of the stub axles 4 having barrel portions 5 which are journaled between arms 6 upon each end of the axle 3 by a bolt 7.

Secured upon each side of the chassis 1 adjacent the forward end thereof are supporting brackets 8 and 9 which have formed on their ends, bearings 10 and 11. Journaled within the bearings 10 and 11 are lamp standards 12 and 13 of hollow formation having secured to their upper ends headlights 14 which may be of any desired type. Secured to the lamp standards 12 and 13 are braces 15 which extend upwardly and are secured upon each side of the headlights 14 to efficiently reinforce and secure the headlights 14 to the lamp standards. Suitable braces 16 are secured to the radiator 2 and to the mud guards 17 of the automobile and have secured thereto suitable bearings 18 which rotatably receive the upper ends of the lamp standards 12 and 13 to prevent said lamp standards from vibrating when the automobile is passing over uneven ground.

Formed on the brackets 8 and 9 are stops 19 which are engaged by lugs 20 carried by each of the lamp standards 12 and 13 for limiting the turning movement of the lamp standards. Secured to each side of the radiator 2 are coil springs 21 which are secured to each of the lamp standards 11 and 12 by eye-bolts 22 for normally holding the headlights 14 in their normal position, or a position where the rays of the light therefrom will be directed straight ahead of the automobile. Suitable collars 23 are secured to each of the lamp standards 12 and 13 by means of set screws 24 for rotatably supporting the lamp standards within the bearings 10 and 11 upon the supporting brackets 8 and 9. The height of the headlights 14 may be readily adjusted by moving the collars 23 upwardly and downwardly upon the lamp standards to allow said lamp standards to be adjusted within the bearings of the supporting brackets 8 and 9. The lamp standards being of hollow formation will allow electric wires or gas tubes to pass upwardly into the headlights for furnishing said headlights with illuminating fuel.

Secured to the lower end of the lamp standards 12 and 13 are operating arms 25 by means of set screws 26 and provided with their free ends apertured to receive connecting links 27 which are provided with their ends bent at right angles to form hooks which extend through the apertures in the operating arms 25 as clearly illustrated in Fig. 5. The barrel portions 5 of the stub axles 4 have extensions 29 formed thereon to receive operating plates 30. The operating plates 30 are keyed to the extension 29 by means of a key 31 fitting within a groove within the operating plates 30 and the extension 29 to hold the operating plates 30 against rotation upon the extensions 29. The operating plates 30 are each provided with an arcuate shaped slot 32 which receives the free hooked end of the connecting link 27, to operatively connect the lamp standards to the stub axles 4 of the automobile.

In operation when the automobile is turned to the right, the left wheel 28 will turn the operating disk 30 which is secured to the stub axles upon which said wheel is journaled and will rotate the lamp standard 13 in a corresponding direction, directing the rays of light from the headlight carried thereby around the curve or turn which the automobile is making, while the lamp standard 12 remains in its normal position and throws the rays of light from its respective headlight straight ahead of the automobile. When the automobile is turned to the left, the lamp standard 12 is rotated by the right stub axle 4 and the lamp standard 13 remains stationary, thus it will be noted when the automobile is turned either to the right or left a light is shown upon the curve which is being made as well as having a light shown directly ahead of the automobile, entirely illuminating the roadway upon a curve to eliminate the danger of accidents which occur upon curves or turns in roadways. As soon as the front wheels have been turned straight, the lamp standard which has been turned will be automatically returned to its normal position by means of the coil spring 21 against the stop 19.

While I have shown and described the preferred embodiment of my invention, it will be understood that minor changes in construction, combination and arrangement of parts may be made without departing from the spirit and scope of the invention as claimed.

Having thus described my invention, what I claim is:—

1. Movable headlights for automobiles comprising lamp standards journaled to each side of the automobile, means for holding the lamp standards in their normal position, headlights secured to the lamp standards, arms secured to the lower ends of the lamp standards, connecting links secured to the arms, operating disks secured to the stub axles of the automobile and provided with arcuate shaped slots to receive the ends of the links to move each of the headlights in opposite directions.

2. Movable headlights for automobiles comprising a pair of lamp standards journaled upon each side of an automobile, means for holding the lamp standards in their normal position, headlights carried by the lamp standards, arms secured to the lower end of the lamp standards, links pivotally connected to the arms, extensions formed on the stub axles of the automobile, operating disks keyed to the extensions and provided with arcuate shaped slots therein for receiving the ends of the connecting links for moving each of the headlights in opposite directions.

In testimony whereof I affix my signature in presence of two witnesses.

CHESTER A. GRAVES.

Witnesses:
F. W. DENNEY,
C. W. BLACK.

Copies of this patent may be obtained for five cents each, by addressing the "Commissioner of Patents, Washington, D. C."